United States Patent
Kondo et al.

(10) Patent No.: US 10,538,625 B2
(45) Date of Patent: *Jan. 21, 2020

(54) POLYMER COMPOUND, INTERMEDIATE COMPOSITION, NEGATIVE ELECTRODE, ELECTRICAL STORAGE DEVICE, SLURRY FOR NEGATIVE ELECTRODE, METHOD FOR PRODUCING POLYMER COMPOUND, AND METHOD FOR PRODUCING NEGATIVE ELECTRODE

(71) Applicant: KABUSHIKI KAISHA TOYOTA JIDOSHOKKI, Kariya-shi, Aichi-ken (JP)

(72) Inventors: Takeshi Kondo, Kariya (JP); Yusuke Sugiyama, Kariya (JP); Nobuhiro Goda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 4 days.

This patent is subject to a terminal disclaimer.

(21) Appl. No.: 16/076,033

(22) PCT Filed: Jan. 30, 2017

(86) PCT No.: PCT/JP2017/003248
§ 371 (c)(1),
(2) Date: Aug. 7, 2018

(87) PCT Pub. No.: WO2017/138395
PCT Pub. Date: Aug. 17, 2017

(65) Prior Publication Data
US 2019/0338073 A1  Nov. 7, 2019

(30) Foreign Application Priority Data
Feb. 12, 2016  (JP) ................. 2016-025070

(51) Int. Cl.
| | |
|---|---|
| *C08G 69/26* | (2006.01) |
| *C08L 77/06* | (2006.01) |
| *H01G 11/06* | (2013.01) |
| *H01G 11/38* | (2013.01) |
| *H01M 4/62* | (2006.01) |
| *H01M 4/133* | (2010.01) |
| *H01M 4/134* | (2010.01) |
| *H01M 4/1393* | (2010.01) |
| *H01M 4/1395* | (2010.01) |
| *H01G 11/86* | (2013.01) |
| *C08F 8/32* | (2006.01) |
| *H01M 4/02* | (2006.01) |

(52) U.S. Cl.
CPC .............. *C08G 69/26* (2013.01); *C08F 8/32* (2013.01); *C08L 77/06* (2013.01); *H01G 11/06* (2013.01); *H01G 11/38* (2013.01); *H01G 11/86* (2013.01); *H01M 4/133* (2013.01);

*H01M 4/134* (2013.01); *H01M 4/1393* (2013.01); *H01M 4/1395* (2013.01); *H01M 4/62* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 9,966,607 | B2 * | 5/2018 | Sugiyama | ............... C08F 8/32 |
| 10,351,672 | B2 * | 7/2019 | Nakagawa | ............ C08G 69/34 |
| 2009/0136845 | A1 | 5/2009 | Choi et al. | |
| 2009/0297948 | A1 * | 12/2009 | Dahn | ................... H01M 4/485 |
| | | | | 429/220 |
| 2014/0312268 | A1 | 10/2014 | Lim | |
| 2014/0335410 | A1 * | 11/2014 | Loveridge | ............. H01M 4/622 |
| | | | | 429/217 |
| 2017/0062828 | A1 | 3/2017 | Sonobe et al. | |

(Continued)

FOREIGN PATENT DOCUMENTS

| | | |
|---|---|---|
| JP | 2003-003031 A | 1/2003 |
| JP | 2008-34379 A | 2/2006 |
| JP | 2009-080971 A | 4/2009 |

(Continued)

OTHER PUBLICATIONS

International Search Report for PCT/JP2017/003248 dated Apr. 4, 2017.

*Primary Examiner* — Rachel Kahn
(74) *Attorney, Agent, or Firm* — Sughrue Mion, PLLC

(57) ABSTRACT

A polymer compound is formed by condensing a polyacrylic acid having some of carboxyl groups converted into a lithium salt with a polyfunctional amine represented by the following general formula (1). A chain structure constituted by the polyacrylic acid has free carboxyl groups and carboxyl groups converted into a lithium salt.

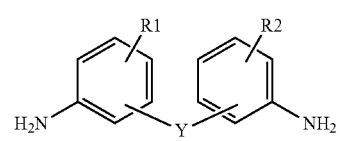

(1)

Y is a straight-chain alkyl group having 1 to 4 carbon atoms, a phenylene group, or an oxygen atom. R1 and R2 are each independently one or more hydrogen atoms, a methyl group, an ethyl group, a trifluoromethyl group, or a methoxy group.

12 Claims, No Drawings

(56) References Cited

U.S. PATENT DOCUMENTS

2017/0324094 A1 11/2017 Sugiyama et al.
2017/0331114 A1 11/2017 Sugiyama et al.

FOREIGN PATENT DOCUMENTS

| JP | 2009-135103 A | 6/2009 |
| JP | 2009-256570 A | 11/2009 |
| JP | 2014-123557 A | 7/2014 |
| WO | 2015/186363 A1 | 12/2015 |
| WO | 2016/063882 A1 | 4/2016 |
| WO | 2016/084548 A1 | 6/2016 |

* cited by examiner

POLYMER COMPOUND, INTERMEDIATE COMPOSITION, NEGATIVE ELECTRODE, ELECTRICAL STORAGE DEVICE, SLURRY FOR NEGATIVE ELECTRODE, METHOD FOR PRODUCING POLYMER COMPOUND, AND METHOD FOR PRODUCING NEGATIVE ELECTRODE

CROSS REFERENCE TO RELATED APPLICATIONS

This application is a National Stage of International Application No. PCT/JP2017/003248 filed Jan. 30, 2017, claiming priority based on Japanese Patent Application No. 2016-025070 filed Feb. 12, 2016.

TECHNICAL FIELD

The present disclosure relates to a polymer compound to be used as a binder for a negative electrode of a power storage device, an intermediate composition of the polymer compound, a negative electrode, a power storage device, a slurry for the negative electrode, a method for producing the polymer compound, and a method for producing the negative electrode.

BACKGROUND ART

Products using rechargeable batteries go on increasing. Rechargeable batteries are much used in portable devices such as cell phones and laptop computers. Rechargeable batteries are paid attention to also as large power sources for electric cars.

Electrodes of rechargeable batteries are constituted, for example, of a current collector formed of a metal material such as copper or aluminum, and an active substance layer bound on the current collector. The active substance layer generally contains a binder for electrodes for binding an active substance on the current collector. In recent years, as the binder for electrodes, polyacrylic acid, which is an inexpensive polymer compound, has been utilized. For example, Patent Document 1 discloses a binder for electrodes containing a polyacrylic acid lithium salt or a polyacrylic acid sodium salt. Patent Document 2 discloses a binder for electrodes containing a polyacrylic acid and a polyethyleneimine. Patent Document 3 discloses a binder for electrodes containing a polyacrylic acid and an amine compound.

PRIOR ART DOCUMENTS

Patent Documents

Patent Document 1: Japanese Laid-Open Patent Publication No. 2009-080971
Patent Document 2: Japanese Laid-Open Patent Publication No. 2009-135103
Patent Document 3: Japanese Laid-Open Patent Publication No. 2003-003031

SUMMARY

Problems that the Disclosure is to Solve

As a result of exhaustive studies, the present researchers have found that a polymer compound formed by condensing a polyacrylic acid having some of carboxyl groups converted into a lithium salt with a polyfunctional amine having a specific molecular structure is useful as a binder for a negative electrode of a power storage device such as a rechargeable battery. An objective of the present disclosure is to provide a polymer compound useful as a binder for a negative electrode of a power storage device, an intermediate composition for obtaining the polymer compound, and a negative electrode, a power storage device and a slurry for the negative electrode which use the polymer compound as the binder for a negative electrode. Further, an objective of the present disclosure is to provide a method for producing the polymer compound, and a method for producing the negative electrode.

Means for Solving the Problems

To achieve the foregoing objective and in accordance with a first aspect of the present disclosure, a polymer compound to be used as a binder for a negative electrode of a power storage device is provided. The polymer compound is formed by condensing a polyacrylic acid having some of carboxyl groups converted into a lithium salt with a polyfunctional amine represented by the following general formula (1). A chain structure constituted by the polyacrylic acid has free carboxyl groups and carboxyl groups converted into a lithium salt.

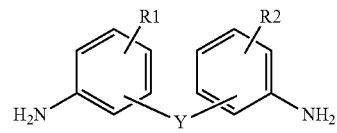

(1)

Y is a straight-chain alkyl group having 1 to 4 carbon atoms, a phenylene group, or an oxygen atom. R1 and R2 are each independently one or more hydrogen atoms, a methyl group, an ethyl group, a trifluoromethyl group, or a methoxy group.

To achieve the foregoing objective and in accordance with a second aspect of the present disclosure, a polymer compound to be used as a binder for a negative electrode of a power storage device is provided. The polymer compound has a chain structure constituted by a polyacrylic acid, and a crosslinked structure connecting carboxyl groups in the chain structure or between the chain structures with each other. The crosslinked structure is at least one crosslinked structure selected from the following general formulae (2) to (4). The chain structure has free carboxyl groups and carboxyl groups converted into a lithium salt

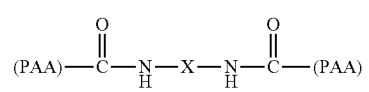

(2)

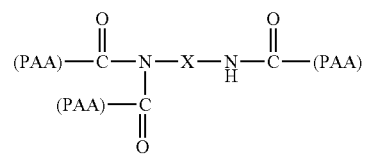

(3)

-continued

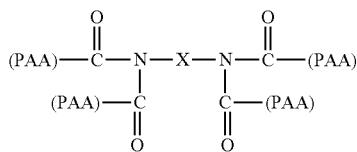
(4)

PAA denotes the chain structure constituted by the polyacrylic acid converted into a lithium salt. X is a structure represented by the following general formula (5).

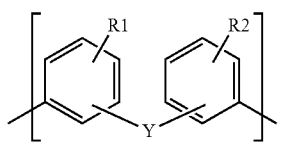
(5)

Y is a straight-chain alkyl group having 1 to 4 carbon atoms, a phenylene group, or an oxygen atom. R1 and R2 are each independently a hydrogen atom, a methyl group, a trifluoromethyl group, or a methoxy group.

To achieve the foregoing objective and in accordance with a third aspect of the present disclosure, an intermediate composition of a polymer compound to be used as a binder for a negative electrode of a power storage device is provided. The intermediate composition contains a polyacrylic acid having some of carboxyl groups converted into a lithium salt, a polyfunctional amine represented by the following general formula (1), and a mixed solvent of a nonaqueous solvent with water. The polyacrylic acid and the polyfunctional amine are dissolved in the mixed solvent:

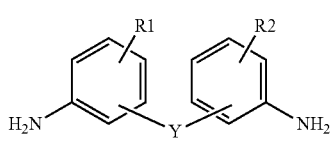
(1)

Y is a straight-chain alkyl group having 1 to 4 carbon atoms, a phenylene group or an oxygen atom. R1 and R2 are each independently one or more hydrogen atoms, a methyl group, an ethyl group, a trifluoromethyl group, or a methoxy group.

To achieve the foregoing objective and in accordance with a fourth aspect of the present disclosure, a method for producing a polymer compound is provided. The method includes heating a polyacrylic acid having some of carboxyl groups converted into a lithium salt, and a polyfunctional amine represented by the following general formula (1) in a mixed solvent of a nonaqueous solvent with water at 150 to 230° C.

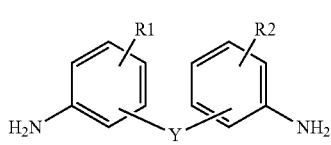
(1)

Y is a straight-chain alkyl group having 1 to 4 carbon atoms, a phenylene group or an oxygen atom. R1 and R2 are each independently one or more hydrogen atoms, a methyl group, an ethyl group, a trifluoromethyl group, or a methoxy group.

To achieve the foregoing objective and in accordance with a fifth aspect of the present disclosure, a negative electrode of a power storage device is provided that includes a binder for a negative electrode containing the above-described polymer compound and a negative electrode active substance. The negative electrode active substance is at least one selected from carbon-based materials capable of occluding and releasing lithium, elements alloyable with lithium, and compounds having an element alloyable with lithium.

To achieve the foregoing objective and in accordance with a sixth aspect of the present disclosure, a power storage device is provided that includes the above-described negative electrode and a nonaqueous electrolyte.

To achieve the foregoing objective and in accordance with a seventh aspect of the present disclosure, a slurry for a negative electrode to be used for production of a negative electrode of a power storage device is provided. The slurry contains the above-described intermediate composition and a negative electrode active substance. The negative electrode active substance is at least one selected from carbon-based materials capable of occluding and releasing lithium, elements alloyable with lithium, and compounds having an element alloyable with lithium.

To achieve the foregoing objective and in accordance with an eighth aspect of the present disclosure, a method for producing a negative electrode of a power storage device is provided. A negative electrode active substance layer is formed on a current collector by using the above-described slurry for a negative electrode.

MODES FOR CARRYING OUT THE DISCLOSURE

A polymer compound according to the present embodiment is a compound formed by condensing (A) a polyacrylic acid (lithiated polyacrylic acid) having some of carboxyl groups converted into a lithium salt with (B) a polyfunctional amine condensed with each other.

The (A) lithiated polyacrylic acid is a compound in which some of carboxyl groups of a polyacrylic acid, a homopolymer of acrylic acid, are converted into a lithium salt. As the (A) lithiated polyacrylic acid, commercially available products may be used, or those in which some of carboxyl groups of a polyacrylic acid are converted into a lithium salt (neutralized) by using a lithium compound such as lithium hydroxide, lithium carbonate, or an organolithium.

The weight average molecular weight of the lithiated polyacrylic acid is not particularly limited, but is, for example, in terms of hydrogen atom in place of lithium, preferably in the range of 10,000 to 2,000,000, more preferably in the range of 25,000 to 1,800,000, and still more preferably in the range of 50,000 to 1,500,000.

When a conventional polymer compound such as a polyamide-imide is used as a binder for a negative electrode, the cycle characteristic of a power storage device is likely to deteriorate in accordance with a decrease in the weight average molecular weight of the polymer compound. By contrast, when the polymer compound according to the present embodiment is used as a binder for a negative electrode, even if the weight average molecular weight of the polyacrylic acid constituting the polymer compound is low, the cycle characteristic of a power storage device is maintained. Hence, as the (A) lithiated polyacrylic acid, polyacrylic acids having a low molecular weight of, for example, 250,000 or lower or 100,000 or lower are suitably used.

The (B) polyfunctional amine is a compound having a structure represented by the following general formula (1).

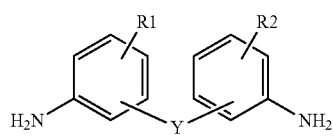
(1)

where Y is a straight-chain alkyl group having 1 to 4 carbon atoms, a phenylene group or an oxygen atom; and the bonding position of Y in each benzene ring may be any of ortho, meta and para positions to the amino group.

When Y is a straight-chain alkyl group or a phenylene group, a substituent(s) may be bonded to a carbon atom(s) constituting the structure. Examples of the substituent(s) bonded to a carbon atom(s) constituting the straight-chain alkyl group include a methyl group, an ethyl group, a fluoromethyl group, a difluoromethyl group, a trifluoromethyl group, a methoxy group, an ethoxy group, and an oxo group. Only one of these substituents may be bonded, or two or more of them may be bonded. Further, the number of substituents bonded to one carbon atom may be one or may be two. Further, a substituent(s) bonded to a carbon atom(s) constituting the straight-chain alkyl group or the phenylene group may be an amino group or a substituent containing an amino group; and in this case, the polyfunctional amine becomes a polyfunctional amine having 3 or more amino groups.

In the general formula (1), R1 and R2 are each independently one or more hydrogen atoms, a methyl group, an ethyl group, a trifluoromethyl group, or a methoxy group. When R1 is a methyl group, an ethyl group, a trifluoromethyl group, or a methoxy group, the bonding position of R1 may be any of ortho, meta, and para positions to the amino group. The same is applied also to R2.

Specific examples of the (B) polyfunctional amine will be described.

Examples of the polyfunctional amine in which Y is a straight-chain alkyl group include 3,3'-diaminodiphenylmethane, 4,4'-diaminodiphenylmethane, 3,4'-diaminodiphenylmethane, 4,4'-ethylenedianiline, 4,4'-diamino-3,3'-dimethyldiphenylmethane, 1,1-bis(4-aminophenyl)cyclohexane, 9,9-bis(4-aminophenyl)fluorene, 2,2'-bis(4-aminophenyl)hexafluoropropane, 4,4'-diaminobenzophenone, 4,4'-methylenebis(2-ethyl-6-methylaniline), and pararosaniline.

Examples of the polyfunctional amine in which Y is a phenylene group include 1,3,5-tris(4-aminophenyl)benzene. Examples of the polyfunctional amine in which Y is an oxygen atom include 4,4'-diaminodiphenyl ether. 1,3,5-tris(4-Aminophenyl)benzene and pararosaniline are trifunctional amines having three amino groups. Only one of the above polyfunctional amines may be used or two or more thereof may be used concurrently.

The blend proportion when the (A) lithiated polyacrylic acid and the (B) polyfunctional amine are condensed is set according to the number of amino groups in the (B) polyfunctional amine. That is, the blend proportion is set such that the total number of carboxyl groups derived from the (A) lithiated polyacrylic acid and not converted into a lithium salt becomes larger than the total number of amino groups derived from the (B) polyfunctional amine. In other words, the blend proportion is set such that the carboxyl groups not converted into a lithium salt in the (A) lithiated polyacrylic acid becomes 1 equivalent or more with respect to 1 equivalent of the amino group in the (B) polyfunctional amine. The ratio of the total number of carboxyl groups derived from the (A) lithiated polyacrylic acid and not converted into a lithium salt to the total number of amino groups derived from the (B) polyfunctional amine (carboxyl group/amino group ratio) is preferably in the range of 1 to 8, and more preferably in the range of 2 to 6.

The polymer compound according to the present embodiment can be obtained by carrying out a mixing step of mixing the (A) lithiated polyacrylic acid and the (B) polyfunctional amine in a solvent, and a heating step of subjecting an intermediate composition obtained by the mixing step to a heat treatment.

The mixing step is a step in which a liquid intermediate composition formed by mixing the (A) lithiated polyacrylic acid with the (B) polyfunctional amine is obtained. The solvent to be used in the mixing step is a mixed solvent of a nonaqueous solvent with water.

Examples of the nonaqueous solvent constituting the mixed solvent include acetone, tetrahydrofuran, ethylene glycol, ethylene glycol monomethyl ether, ethylene glycol dimethyl ether, diethylene glycol dimethyl ether, propylene carbonate, γ-butyrolactone, N-methyl-2-pyrrolidone, dimethylformamide, dimethylacetamide, acetonitrile, dimethyl sulfoxide, and ethylene glycol monobutyl ether. Only one of these nonaqueous solvents may be mixed or two or more thereof may be mixed concurrently.

The mixing proportion in the mixed solvent as the mass ratio of the nonaqueous solvent to water is set at a proportion in which the (A) lithiated polyacrylic acid and the (B) polyfunctional amine can dissolve (do not deposit). The mixing proportion is set, for example, according to the degree of lithiation of the (A) lithiated polyacrylic acid determined by the following expression.

$$\text{The degree of lithiation (\%)}=LC/(C-A)\times 100$$

C: the total number of carboxyl groups derived from the lithiated polyacrylic acid (the total number including carboxyl groups converted into a lithium salt)

LC: out of carboxyl groups derived from the lithiated polyacrylic acid, the total number of carboxyl groups converted into a lithium salt A: the total number of amino groups derived from the polyfunctional amine For example, when the degree of lithiation of the (A) lithiated polyacrylic acid is in the range of 5 to 50%, the mixing proportion of the nonaqueous solvent to water is made preferably in the range of 2:1 to 1:2. Further, when the degree of lithiation of the (A) lithiated polyacrylic acid is in the range of 50 to 75%, the mixing proportion of the nonaqueous solvent to water is made preferably in the range of 1:1 to 1:2.

The heating step is a step of subjecting the intermediate composition to a heat treatment to thereby condense the (A) lithiated polyacrylic acid with the (B) polyfunctional amine contained in the intermediate composition. The heating temperature in the heating step is, from the viewpoint of efficiently forming amide bond portions and imide bond portions between the (A) lithiated polyacrylic acid and the (B) polyfunctional amine, preferably in the range of 150 to 230° C., and more preferably in the range of 180 to 200° C. When the heating temperature is raised, the characteristic (cycle characteristic) of power storage devices such as rechargeable batteries can be enhanced, when the polymer compound according to the present embodiment is used as the binder for a negative electrode.

When the intermediate composition is heated, a catalyst may be added to the intermediate composition in order to progress the condensation reaction to form amide bonds and imide bonds or to enhance the reaction rate of the condensation reaction. As the catalyst, for example, dehydration condensation catalysts such as 1-methylimidazole, 2-methylimidazole, N,N'-dicyclohexylcarbodiimide, N,N'-carbonyldiimidazole, N,N'-diisopropylcarbodiimide, 1-[3-(dimethylamino)propyl]-3-ethylcarbodiimide, 1-ethyl-3-(3-dimethylaminopropyl)carbodiimide.hydrochloric acid, diphenylphosphoric acid azido, and BOP reagents can effectively be used. When these catalysts are added, since amide bonds and imide bonds are formed at a lower temperature, the production efficiency of the polymer compound is enhanced.

It is preferable that the intermediate composition be subjected to a preheat treatment before the heating step. The preheating temperature is preferably in the range of 40 to 140° C., and more preferably in the range of 60 to 130° C. The preheat treatment associates the (A) lithiated polyacrylic acid with the (B) polyfunctional amine contained in the intermediate composition and forms such a state that it is easy for the condensation reaction of the carboxyl groups with the amino groups to progress. Consequently, in the heating step, the condensation reaction efficiently progresses. By the preheat treatment, the condensation reaction of the carboxyl groups with the amino groups may partially progress and form amide bond portions and imide bond portions.

Then, when the preheated intermediate composition is used, it is preferable that the heating step be carried out in such a state that the solvent contained in the intermediate composition have been removed. In this case, it becomes easy for the condensation reaction of the (A) lithiated polyacrylic acid with the (B) polyfunctional amine to progress.

Then, by carrying out the heating step, there is obtained the polymer compound formed by condensation of the (A) lithiated polyacrylic acid with the (B) polyfunctional amine. It is conceivable that the polymer compound has a structure in which at least one of amide bonds and imide bonds is formed between carboxyl groups of the (A) lithiated polyacrylic acid and amino groups of the (B) polyfunctional amine, and the (A) lithiated polyacrylic acids are thus crosslinked.

That is, the polymer compound has a chain structure constituted by the (A) lithiated polyacrylic acid and crosslinked structures connecting carboxyl groups in the chain structure or between the chain structures. Then, in the chain structure constituted by the (A) lithiated polyacrylic acid, free carboxyl groups and carboxyl groups converted into a lithium salt are present, and the crosslinked structure is at least one crosslinked structure selected from the following general formulae (2) to (4).

Then, in the chain structure constituted by the (A) lithiated polyacrylic acid, the ratio of free carboxyl groups to carboxyl groups converted into a lithium salt (free carboxyl groups:carboxyl groups converted into a lithium salt) is preferably in the range of 95:5 to 25:75, and more preferably in the range of 95:5 to 45:55.

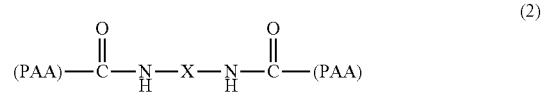

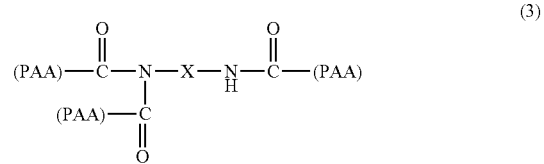

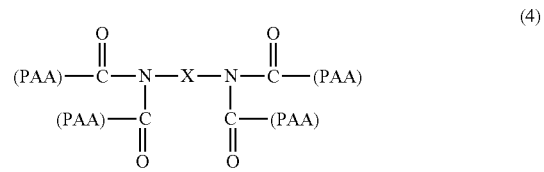

In the general formulae (2) to (4), PAA denotes a chain structure constituted by the lithiated polyacrylic acid. X is a structure represented by the following general formula (5). In the general formulae (3) to (4) having an imide structure, two carbonyl groups constituting one imide structure may be ones each bonded to a different chain structure, or may be ones bonded to the same chain structure. For example, when two carbonyl groups constituting an imide structure are ones bonded to adjacent carbons in the same chain structure, the imide structure forms a maleimide structure.

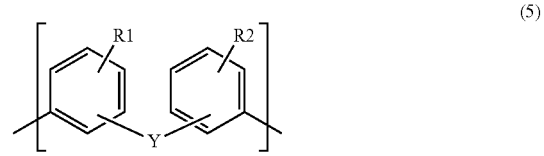

Y in the general formula (5) is a straight-chain alkyl group having 1 to 4 carbon atoms, a phenylene group, or an oxygen atom. The bonding position of Y in each benzene ring may be any of ortho, meta, and para positions to the amino group. Y in the general formula (5) is a structure according to Y in the general formula (1).

In the general formula (5), R1 and R2 are each independently one or more hydrogen atoms, a methyl group, an ethyl group, a trifluoromethyl group, or a methoxy group. When R1 is a methyl group, a trifluoromethyl group, or a methoxy group, the bonding position of R1 may be any of ortho, meta, and para positions to the amino group. The same is applied also to R2. R1 and R2 in the general formula (5) have structures according to R1 and R2 in the general formula (1).

It is preferable that the polymer compound have both of amide bond portions and imide bond portions in its crosslinked structure. That is, it is preferable that the polymer compound has, as its crosslinked structure, at least, crosslinked structures of the general formula (2) and the general formula (4), or at least a crosslinked structure of the general formula (3).

Further, the polymer compound may have, in the molecular structure, an acid anhydride structure (CO—O—CO) formed by dehydration-condensing two carboxyl groups. The acid anhydride structure may be formed in the same chain structure (PAA), or may be formed between different chain structures (PAA). That is, two carbonyl carbons contained in the acid anhydride structure may be bonded to the same chain structure (PAA), or may be bonded to different chain structures (PAA).

Then, the polymer compound according to the present embodiment may further have a second crosslinked structure.

As a polymer compound further having a second crosslinked structure, the polymer compound may be, for example, the compound formed by condensing the (A) lithiated polyacrylic acid with the (B) polyfunctional amine represented by the general formula (1) and other polyfunctional amines. In this case, the polymer compound has, in addition to a crosslinked structure derived from the polyfunctional amine represented by the general formula (1), further a second crosslinked structure derived from the other polyfunctional amines. By adding the second crosslinked structure, physical properties, such as strength and flexibility, of the polymer compound can be adjusted.

Examples of the other polyfunctional amines include 1,4-diaminobutane, 1,6-diaminohexane, 1,8-diaminooctane, 2-aminoaniline (1,2-phenylenediamine), 3-aminoaniline (1,3-phenylenediamine), 4-aminoaniline (1,4-phenylenediamine), 2,4-diaminopyridine, 2,5-diaminopyridine, 2,6-diaminopyridine, and 1,3-diiminoisoindoline.

The blend proportion of the other polyfunctional amines is, with respect to 10 parts by mass of the (B) polyfunctional amine represented by the general formula (1), preferably 1 part by mass or lower. By making the proportion to be the above proportion, it can be suppressed that physical properties, such as strength and flexibility, of the polymer compound largely vary and become unsuitable to the binder for a negative electrode.

Then, one example of a method for producing a negative electrode using the polymer compound according to the present embodiment as a binder for a negative electrode will be described.

First, a negative electrode active substance, a binder for a negative electrode, and a solvent are mixed to thereby prepare a slurry. At this time, as required, other components such as a conductive auxiliary agent may further be mixed.

As the negative electrode active substance, a known substance used as a negative electrode active substance of power storage devices such as rechargeable batteries, for example, a carbon-based material, an element alloyable with lithium, or a compound having an element alloyable with lithium can be used.

As the carbon-based material, for example, a carbon-based material capable of occluding and releasing lithium; and specific examples thereof include non-graphitizable carbon, natural graphite, artificial graphite, cokes, graphites, glasslike carbons, organic polymer compound baked bodies, carbon fibers, active carbon and carbon blacks can be used.

Examples of the element alloyable with lithium include Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, Si is particularly preferable.

Examples of the compound having an element alloyable with lithium include compounds having element(s) selected from Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, silicon-based materials being compounds having Si are particularly preferable.

Examples of the silicon-based materials include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_V$ ($0<V\leq2$), $SnSiO_3$, and $LiSiO$. Among these, $SiO_V$ ($0<V\leq2$) is particularly preferable.

Further, as disclosed in International Publication No. WO 2014/080608, there can also be used a silicon material obtained from $CaSi_2$ through a calcium-removal reaction. The silicon material is obtained, for example, by removing calcium (for example, a heat treatment at 300 to 1,000° C.) from a layered polysilane obtained by treating $CaSi_2$ with an acid (for example, hydrochloric acid or hydrogen fluoride). It is particularly preferable that the polymer compound according to the present embodiment be used in a combination with a silicon-based material being a negative electrode active substance large in the degree of expansion and contraction in charge and discharge. As the negative electrode active substance, only one of the above substances may be used, or two or more thereof may be used concurrently.

As the binder for a negative electrode to be mixed in the slurry, the above intermediate composition is used.

Further, as the binder for a negative electrode, other binders for a negative electrode may be used concurrently. Examples of the other binders for a negative electrode include polyvinylidene fluoride, polyethylene tetrafluoride, styrene-butadiene rubber, polyimide, polyamideimide, carboxymethylcellulose, polyvinyl chloride, methacryl resins, polyacrylonitrile, modified polyphenylene oxide, polyethylene oxide, polyethylene, polypropylene, polyacrylic acid, and phenol resins.

Only one of these other binders for a negative electrode may be used, or two or more thereof may be used concurrently. When other binders for a negative electrode are concurrently used, the solid content of the intermediate composition is contained preferably in 1% by mass or more, and more preferably in 10% by mass or more, in the total solid content of the binder for a negative electrode.

The blend proportion in mass ratio of the negative electrode active substance to the binder for a negative electrode (negative electrode active substance: binder for a negative electrode) can suitably be set according to the negative electrode active substance and the binder for a negative electrode. The blend proportion is, for example, preferably in the range of 5:3 to 99:1, more preferably in the range of 3:1 to 97:3, and still more preferably in the range of 16:3 to 95:5.

As the solvent, a mixed solvent of a nonaqueous solvent with water is used. The mixing proportion of the nonaqueous solvent to water in the mixed solvent is set at a proportion in which each component constituting the intermediate composition is dissolvable (does not deposit) according to the degree of lithiation. Specific examples of the nonaqueous solvent and the mixing proportion according to the degree of lithiation are the same as in the mixed solvent used in the mixing step. When the intermediate composition contains the mixed solvent of a sufficient amount as slurry, no solvent may be added in preparation of the slurry.

As the conductive auxiliary agent, a known conductive auxiliary agent to be used for a negative electrodes of power storage devices such as rechargeable batteries can be used. Specific examples of the conductive auxiliary agent include acetylene black, carbon nanotubes, and Ketjen black. Only one of these conductive auxiliary agents may be used, or two or more thereof may be used concurrently.

When the slurry is made to contain a conductive auxiliary agent, it is preferable that the slurry is made to contain a dispersant together with the conductive auxiliary agent. Specific examples of the dispersant include polyvinylpyrrolidone, polyvinyl alcohol, polyvinyl butyral, and triazine compounds. Only one of these dispersants may be used, or two or more thereof may be used concurrently.

Then, the slurry is applied on a current collector to thereby form a negative electrode active substance layer composed of the slurry on the surface of the current collector. Thereafter, the solvents (the solvent of the slurry and the solvent contained in the intermediate composition) contained in the negative electrode active substance layer are removed; and the negative electrode active substance layer is subjected to a drying treatment, and subjected to a heat treatment to thereby cure the negative electrode active substance layer. By this heat treatment, the (A) lithiated polyacrylic acid and the (B) polyfunctional amine contained in the intermediate composition condense to thereby form the polymer compound according to the present embodiment in the negative electrode active substance layer. Although the heat treatment can be carried out in the state that the negative electrode active substance layer contains any solvent, it is more preferable that the heat treatment be carried out in the state that the negative electrode active substance layer has been dried.

Examples of specific methods of the drying treatment and the heat treatment include methods of heating by using heat sources such as hot air, infrared rays, microwaves, and high frequencies under ordinary pressure or reduced pressure. When the heat treatment is carried out, it is preferable that heating be carried out from the current collector side rather than from the negative electrode active substance layer side. Then, it is preferable that the drying treatment be carried out by slowly heating at a low temperature rather than by quickly heating at a high temperature; and it is preferable that the heat treatment be carried out by quickly heating at a high temperature rather than by slowly heating at a low temperature. Such heating can enhance the initial efficiency and the cycle characteristic of power storage devices.

As the current collector, there can be used a known metal material to be used as current collectors for a negative electrode of power storage devices such as rechargeable batteries. Examples of the metal material utilizable for the current collector include silver, copper, gold, aluminum, magnesium, tungsten, cobalt, zinc, nickel, iron, platinum, tin, indium, titanium, ruthenium, tantalum, molybdenum, and stainless steel.

The negative electrode using the polymer compound according to the present embodiment as the binder for a negative electrode can effectively be used for nonaqueous power storage devices having a nonaqueous electrolyte as their electrolyte. Examples of the power storage devices include rechargeable batteries, electric double layer capacitors, and lithium ion capacitors. Further, such power storage devices are useful as nonaqueous rechargeable batteries for driving motors of electric cars and hybrid cars, and as nonaqueous rechargeable batteries to be utilized in personal computers, portable communication devices, household appliances, office devices, industrial devices, and the like.

The present embodiment has the following advantages.

(1) The polymer compound according to the present embodiment is a compound formed by condensing the (A) lithiated polyacrylic acid with the (B) polyfunctional amine; and a chain structure constituted by lithiated polyacrylic acid has free carboxyl groups and carboxyl groups converted into a lithium salt. Further, the polymer compound according to the present embodiment has a chain structure constituted by polyacrylic acid and a crosslinked structure in which carboxyl groups in the chain structure or between the chain structures are connected; the crosslinked structure is at least one crosslinked structure selected from the above formulae (2) to (4). The chain structure has free carboxyl groups and carboxyl groups converted into a lithium salt.

The polymer compound according to the present embodiment is useful as a binder for a negative electrode of power storage devices. By using the polymer compound according to the present embodiment as the binder for a negative electrode, the characteristic (cycle characteristic) of the power storage devices can be enhanced. The cycle characteristic particularly at low temperatures can be enhanced.

The following point is conceivable as a factor of the improvement of characteristics of the power storage devices by using the polymer compound according to the present embodiment as the binder for an electrode. That is, the polymer compound according to the present embodiment has a structure in which some of carboxyl groups the chain structure has are converted into a lithium salt. Hence, as compared with polymer compounds composed of polyacrylic acid or a polyacrylic acid derivative, the polarity as the polymer compound becomes high. With the polarity becoming high, the dielectric constant of the polymer compound then becomes high. Thereby, when the polymer compound is used as the binder for a negative electrode, the barrier when lithium and the like move inside the polymer compound is alleviated and it becomes easy for lithium and the like to move inside the polymer compound. Consequently, the cycle characteristic of power storage devices is enhanced.

Further, the following point is also conceivable as another factor thereof. That is, when using a polymer compound composed of polyacrylic acid or a polyacrylic acid derivative is used as a binder for a negative electrode, a heat treatment or the like carried out in fabrication of a negative electrode dehydration-condenses carboxyl groups the chain structure has and forms a crosslinked structure by an acid anhydride structure in some cases. Since the length of the crosslinked structure by the acid anhydride structure is short, when the crosslinked structure is excessively formed, the chain structures densely approach each other and the polymer compound becomes rigid, and the flexibility of the polymer compound is impaired.

For such problems, in the polymer compound according to the present embodiment, by making the chain structure to be a structure in which some of carboxyl groups the chain structure has are converted into a lithium salt, side chains in the chain structure are made to be the ones incapable of forming an acid anhydride structure. Thereby, the number of carboxyl groups capable of forming the acid anhydride structure becomes small and excessive formation of a crosslinked structure by the acid anhydride structure is suppressed.

Then, the suppression of excessive formation of the crosslinked structure by the acid anhydride structure ensures the flexibility of the polymer compound. Thereby, when the polymer compound is used as the binder for a negative electrode, there is improved the conformability to the volume change of the polymer compound by the expansion and contraction along with occlusion and release of lithium and the like. Further, the suppression of excessive formation of the crosslinked structure by the acid anhydride structure suppresses excessive densification of a network structure of the polymer compound and makes it easy for lithium and the like to pass inside the polymer compound. As a result, the cycle characteristic of power storage devices is enhanced.

(2) The polymer compound according to the present embodiment as the binder for a negative electrode has a property of facilitating maintenance of the cycle characteristic of power storage devices even if the weight average molecular weight of the chain structure composed of polyacrylic acid is made low. Hence, also when the polymer compound according to the present embodiment is made to be a polymer compound of a low molecular weight in which chain structure moieties are short, the polymer compound can effectively function as the binder for a negative electrode. Also when the low-molecular weight polymer compound is used as the binder for a negative electrode, a slurry can be prepared by using a smaller amount of a solvent. From this, the solid content ratio of the slurry can be set at a high one. Thereby, since the drying time for volatilizing the solvent from the negative electrode active substance layer when the negative electrode is made is shortened, the productivity of the negative electrode is improved. Therefore, the case of using the polymer compound according to the present embodiment as the binder for a negative electrode facilitates improvement of the productivity of the negative electrode.

(3) In the partial structure of the crosslinked structure represented by the above general formula (5), Y is a straight-chain alkyl group having 1 to 4 carbon atoms, a phenylene group, or an oxygen atom.

According to the above constitution, since the constitution has a movable partial structure in the crosslinked structure, the elasticity of the polymer compound is improved. Thereby, it becomes easy for the binder for a negative electrode using the polymer compound according to the present embodiment to conform to the volume change by expansion and contraction along with occlusion and release of lithium and the like. Consequently, the characteristics of power storage devices are enhanced.

(4) The intermediate composition of the polymer compound contains the (A) lithiated polyacrylic acid, the (B) polyfunctional amine, and the mixed solvent of the nonaqueous solvent with water, wherein the (A) lithiated polyacrylic acid and the (B) polyfunctional amine are dissolved in the mixed solvent. Then, when the degree of lithiation is in the range of 5 to 50%, the mixing proportion of the nonaqueous solvent to water in the mixed solvent is in the range of 2:1 to 1:2; and when the degree of lithiation is in the range of 50 to 75%, the mixing proportion of the nonaqueous solvent to water in the mixed solvent is in the range of 1:1 to 1:2.

According to the above constitution, deposition of the components constituting the intermediate composition in the mixed solvent is suppressed. Consequently, the polymer compound according to the present embodiment can efficiently be obtained. Further, when a negative electrode is produced from a slurry prepared by mixing the intermediate composition with the negative electrode active substance, the uneven presence in the negative electrode of the polymer compound (binder for a negative electrode) obtained from the intermediate composition is suppressed.

That is, the deposition of the components constituting the intermediate composition in the mixed solvent means that the components cohere. In the case of attempting to obtain the polymer compound by condensing the intermediate composition in the state that some of the components have deposited, by a heat treatment, it becomes difficult for the condensation reaction to progress in portions where the components have cohered, and the yield of the target polymer compound lowers. Then, when the negative electrode is produced by using the intermediate composition in the state that some of the components have deposited, the target polymer compound comes to be not sufficiently formed in portions where the components have cohered. Hence, it becomes easy for portions where the polymer compound as the binder for a negative electrode is not sufficiently present to be produced. With respect to this point, according to the above constitution, since the deposition of the components constituting the intermediate composition in the mixed solvent is suppressed, when the polymer compound is obtained, and the negative electrode is produced, arising of the above problem can be suppressed.

EXAMPLES

Examples more specifying the above embodiment will now be described.
<Test 1>

The battery characteristics of power storage devices when a polymer compound formed by condensing a lithiated polyacrylic acid with a polyfunctional amine having a specific molecular structure was used as a binder for a negative electrode was evaluated.

Hereinafter, a polyacrylic acid is represented as PAA; and N-methyl-2-pyrrolidone, as NMP.

Example 1A: PAA+4,4'-diaminodiphenylmethane, a Degree of Lithiation of 10%

A PAA having a weight average molecular weight of 50,000 was dissolved in water to thereby prepare a 30-mass % PAA aqueous solution; and 10 g (41.6 mmol in terms of monomer of the PAA) of the PAA aqueous solution was taken in a flask in a nitrogen atmosphere. 0.131 mg (3.12 mmol) of lithium hydroxide monohydrate was added in the flask and stirred at room temperature for 30 min to thereby convert some of carboxyl groups of the PAA contained in the PAA aqueous solution into a lithium salt. Separately, 1.03 g (5.19 mmol) of 4,4'-diaminodiphenylmethane was dissolved in 14 g of NMP to thereby prepare a polyfunctional amine/NMP solution. The polyfunctional amine/NMP solution was dropped in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Example 1A in the state of being a solution whose solvent was a mixed solvent (NMP:water=2:1) of NMP with water. The degree of lithiation of the intermediate composition of Example 1A could be calculated by the following expression, and was 10%.

Degree of lithiation (%)=a molar number of lithium hydroxide monohydrate/{(molar number of PAA in terms of monomer thereof)−(molar number of polyfunctional amine)×(number of amino groups of *t*polyfunctional amine)}×100

Example 1B: PAA+4,4'-diaminodiphenylmethane, a Degree of Lithiation of 20%

An intermediate composition of Example 1B in a solution state was obtained by the same method as in Example 1A, except for altering the amount of lithium hydroxide monohydrate added to 0.262 mg (6.24 mmol). The degree of lithiation of the intermediate composition of Example 1B was 20%.

Example 1C: PAA+4,4'-diaminodiphenylmethane, a Degree of Lithiation of 50%

An intermediate composition of Example 1C in a solution state was obtained by the same method as in Example 1A, except for altering the amount of lithium hydroxide monohydrate added to 0.655 mg (15.6 mmol). The degree of lithiation of the intermediate composition of Example 1C was 50%.

Reference Example 1:
PAA+4,4'-diaminodiphenylmethane, a Degree of Lithiation of 0%

A PAA having a weight average molecular weight of 50,000 was dissolved in NMP to thereby prepare a 30-mass % PAA/NMP solution; and 10 g (41.6 mmol in terms of monomer of the PAA) of the PAA/NMP solution was taken in a flask in a nitrogen atmosphere. Separately, 1.03 g (5.19 mmol) of 4,4'-diaminodiphenylmethane was dissolved in 14 g of NMP to thereby prepare a polyfunctional amine/NMP solution. The polyfunctional amine/NMP solution was dropped in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Reference Example 1 in the state of being a solution. The degree of lithiation of the intermediate composition of Reference Example 1 was 0%.

Reference Example 2: PAA+1,6-diaminohexane, a Degree of Lithiation of 10%

A PAA having a weight average molecular weight of 50,000 was dissolved in water to thereby prepare a 30-mass % PAA aqueous solution; and 10 g (41.6 mmol in terms of monomer of the PAA) of the PAA aqueous solution was taken in a flask in a nitrogen atmosphere. 0.131 mg (3.12 mmol) of lithium hydroxide monohydrate was added in the flask and stirred at room temperature for 30 min to thereby convert some of carboxyl groups of the PAA contained in the PAA solution into a lithium salt. Separately, 0.603 g (5.19 mmol) of 1,6-diaminohexane was dissolved in 14 g of NMP to thereby prepare a polyfunctional amine/NMP solution. The polyfunctional amine/NMP solution was dropped in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Reference Example 2 in the state of being a solution. The degree of lithiation of the intermediate composition of Reference Example 2 was 10%.

Fabrication of Electrode Sheets

By using the obtained intermediate compositions of Examples, an electrode sheet using a polymer compound obtained from each intermediate composition as a binder for a negative electrode was fabricated. Then, the obtained electrode sheet was used to fabricate a lithium ion rechargeable battery, and battery characteristics of the lithium ion rechargeable battery were evaluated.

85 parts by mass of SiO, 5 parts by mass of an acetylene black, and 10 parts by mass of the solution of each intermediate composition were mixed; and a mixed solvent of NMP with water in an arbitrary mixing ratio was added to the mixture to thereby prepare a slurry. The slurry was applied in a film form on the surface of an electrolytic copper foil (current collector) of 20 μm by using a doctor blade method. Then, NMP in the slurry was volatilized and removed to thereby form a negative electrode active substance layer on the electrolytic copper foil. Then, the electrolytic copper foil and the negative electrode active substance layer were compressed such that the thickness of the negative electrode active substance layer became 20 μm by using a roll press machine to thereby firmly adhere and unite the electrolytic copper foil with the negative electrode active substance layer.

Thereafter, the negative electrode active substance layer from which NMP had been removed and which was in a dried state was subjected to a heat treatment under vacuum (reduced pressure) at 200° C. for 2 hours to thereby condensation-react the intermediate composition contained in the negative electrode active substance layer and thermally cure the negative electrode active substance layer. Thereby, an electrode sheet containing a polymer compound having a crosslinked structure as a binder for a negative electrode was obtained.

Similar electrode sheets were fabricated by using the aqueous solutions of the intermediate compositions of Reference Examples or PAA in place of the aqueous solutions of the intermediate compositions of Examples.

Fabrication of Lithium Ion Rechargeable Batteries

A separator was disposed between a negative electrode (evaluation electrode) made by cutting the electrode sheet into a circular shape of 11 mm in diameter and a positive electrode made by cutting a metal lithium foil of 500 μm in thickness into a circular shape of 13 mm in diameter to thereby fabricate a battery of the electrode assembly. The battery of the electrode assembly was accommodated in a battery case; a nonaqueous electrolyte was injected; then, the battery case was sealed to thereby obtain a lithium ion rechargeable battery. As the separator, a glass filter manufactured by Hoechst Celanese Corp. and Celgard 2400 manufactured by Celgard LLC were used. As the nonaqueous electrolyte, a nonaqueous electrolyte in which lithium hexafluorophosphate was dissolved at a concentration of 1 M in a mixed solvent of ethylene carbonate with diethyl carbonate in a volume ratio of 1:1 was used.

Evaluation of Battery Characteristics

For the obtained lithium ion rechargeable batteries, discharging was carried out at a direct current of 0.2 mA until the voltage of the negative electrode to the positive electrode became 0.01 V; and charging at a direct current of 0.2 mA was carried out at 10 min after the finish of the discharging until the voltage of the negative electrode to the positive electrode became 1.0 V. The discharge capacity at this time was taken as an initial discharge capacity; and the charge capacity, as an initial charge capacity. Then, the initial efficiency was calculated based on the following expression. The results are shown in Table 1.

Initial efficiency (%)=(initial charge capacity/initial discharge capacity)×100

Further, with the above charging and discharging being taken as one cycle, the charging and discharging of predetermined cycles was carried out at 0° C. or 25° C., and the cycle characteristic was calculated based on the following expression. The results are shown in Table 1.

Cycle characteristic (%)=(charge capacity after predetermined cycles/initial charge capacity)×100

TABLE 1

| Test Example | 1 | 2 | 3 | 4 | 5 | 6 |
|---|---|---|---|---|---|---|
| Binder for Negative Electrode | Example 1A | Example 1B | Example 1C | Reference Example 1 | Reference Example 2 | PAA |
| Polyfunctional Amine | Specific molecular structure | Specific molecular structure | Specific molecular structure | Specific molecular structure | Non-specific molecular structure | — |
| Degree of Lithiation (%) | 10 | 20 | 50 | 0 | 10 | 0 |
| Initial Charge Capacity (mAh/g) | 1710 | 1740 | 1690 | 1700 | 1715 | 1811 |
| Initial Efficiency (%) | 78 | 79 | 79 | 75 | 75 | 83 |
| Cycle Characteristic (%) 25° C., 50 cycles | 92 | 93 | 93 | 88 | 66 | 29 |
| Cycle Characteristic (%) 0° C., 50 cycles | 86 | 83 | 83 | 75 | 68 | — |

As indicated in Table 1, it was confirmed that in Test Examples 1 to 5, which used, as their binder for a negative electrode, a polymer compound in which polyfunctional amine was condensed and a crosslinked structure was formed, evaluation of the cycle characteristic at 25° C. was higher as compared with Test Example 6 using PAA as a binder for a negative electrode.

Then, it was confirmed that in Test Examples 1 to 3, which used, as their binder for a negative electrode, a polymer compound formed by condensing PAA having some of carboxyl groups converted into a lithium salt, with a polyfunctional amine having a specific molecular structure among polymer compounds in which a crosslinked structure is formed by condensation with a polyfunctional amine, evaluation of the initial efficiency and the cycle characteristic became higher as compared with Test Example 4, which used PAA not converted into a lithium salt, and Test Example 5, which used a polyfunctional amine having no specific molecular structure. The cycle characteristic at a low temperature (0° C.) were also evaluated particularly for Test Examples 1 to 5 and it was confirmed that the cycle characteristic at a low temperature (0° C.) was largely improved for Test Examples 1 to 3.

From these results, it is clear that among polymer compounds in which a crosslinked structure is formed by condensation with a polyfunctional amine, polymer compounds in which PAA having some of carboxyl groups converted into a lithium salt is condensed with a polyfunctional amine having a specific molecular structure are useful as a binder for a negative electrode of power storage devices.

<Test 2>

Then, the changes in the battery characteristics of power storage devices were evaluated with the polyfunctional amine varied, for the cases when a polymer compound formed by condensing a lithiated PAA with a polyfunctional amine having a specific molecular structure was used as a binder for a negative electrode.

Example 2: PAA+Diaminodiphenyl Ether, a Degree of Lithiation of 10%

A PAA having a weight average molecular weight of 50,000 was dissolved in water to thereby prepare a 30-mass % PAA aqueous solution; and 10 g (41.6 mmol in terms of monomer of the PAA) of the PAA aqueous solution was taken in a flask in a nitrogen atmosphere. 0.131 mg (3.12 mmol) of lithium hydroxide monohydrate was added in the flask and stirred at room temperature for 30 min to thereby convert some of carboxyl groups of the PAA contained in the PAA aqueous solution into a lithium salt. Separately, 1.039 g (5.19 mmol) of 4,4'-diaminodiphenyl ether was dissolved in 14 g of NMP to thereby prepare a polyfunctional amine/NMP solution. The polyfunctional amine/NMP solution was dropped in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Example 2 in the state of being a solution. The degree of lithiation of the intermediate composition of Example 2 was 10%.

Example 3: PAA+1,3,5-tris(4-aminophenyl)benzene, a Degree of Lithiation of 10%

A PAA having a weight average molecular weight of 50,000 was dissolved in water to thereby prepare a 30-mass % PAA aqueous solution; and 10 g (41.6 mmol in terms of monomer of the PAA) of the PAA aqueous solution was taken in a flask in a nitrogen atmosphere. 0.131 mg (3.12 mmol) of lithium hydroxide monohydrate was added in the flask and stirred at room temperature for 30 min to thereby convert some of carboxyl groups of the PAA contained in the PAA aqueous solution into a lithium salt. Separately, 1.824 g (5.19 mmol) of 1,3,5-tris(4-aminophenyl)benzene was dissolved in 14 g of NMP to thereby prepare a polyfunctional amine/NMP solution. The polyfunctional amine/NMP solution was dropped in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Example 3 in the state of being a solution. The degree of lithiation of the intermediate composition of Example 3 was 10%.

Example 4: PAA+3,3'-diaminodiphenylmethane, a Degree of Lithiation of 10%

A PAA having a weight average molecular weight of 50,000 was dissolved in water to thereby prepare a 30-mass % PAA aqueous solution; and 10 g (41.6 mmol in terms of monomer of the PAA) of the PAA aqueous solution was taken in a flask in a nitrogen atmosphere. 0.131 mg (3.12 mmol) of lithium hydroxide monohydrate was added in the flask and stirred at room temperature for 30 min to thereby convert some of carboxyl groups of the PAA contained in the aqueous PAA solution into a lithium salt. Separately, 1.029 g (5.19 mmol) of 3,3'-diaminodiphenylmethane was dissolved in 14 g of NMP to thereby prepare a polyfunctional amine/NMP solution. The polyfunctional amine/NMP solution was dropped in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Example 4 in the state of being a solution. The degree of lithiation of the intermediate composition of Example 4 was 10%.

Example 5: PAA+4,4'-ethylenedianiline, a Degree of Lithiation of 10%

A PAA having a weight average molecular weight of 50,000 was dissolved in water to thereby prepare a 30-mass % PAA aqueous solution; and 10 g (41.6 mmol in terms of monomer of the PAA) of the PAA aqueous solution was taken in a flask in a nitrogen atmosphere. 0.131 mg (3.12 mmol) of lithium hydroxide monohydrate was added in the flask and stirred at room temperature for 30 min to thereby convert some of carboxyl groups of the PAA contained in the PAA aqueous solution into a lithium salt. Separately, 1.101 g (5.19 mmol) of 4,4'-ethylenedianiline was dissolved in 14 g of NMP to thereby prepare a polyfunctional amine/NMP solution. The polyfunctional amine/NMP solution was dropped in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Example 5 in the state of being a solution. The degree of lithiation of the intermediate composition of Example 5 was 10%.

Evaluation of Battery Characteristics

By using the obtained intermediate compositions of Examples 2 to 5, an electrode sheet using a polymer compound obtained from each intermediate composition as a binder for a negative electrode was fabricated. Then, the obtained electrode sheet was used to fabricate a lithium ion rechargeable battery, and battery characteristics of the lithium ion rechargeable battery were evaluated. The results are shown in Table 2. Making methods of the electrode sheet and the lithium ion rechargeable battery and the evaluation method of battery characteristics of the lithium ion rechargeable battery were the same as the methods in Test 1.

As indicated in Table 2, it was confirmed, also when the polyfunctional amine was varied, that the same-level battery characteristics were provided as compared with Test Example 1 using 4,4'-diaminodiphenylmethane.

<Test 3>

Then, with respect to intermediate compositions containing a lithiated PAA, a polyfunctional amine having a specific molecular structure, and a mixed solvent of a nonaqueous solvent with water, the changes in dissolvability when the degree of lithiation and the mixing ratio of the mixed solvent were varied were evaluated.

A PAA having a weight average molecular weight of 50,000 was dissolved in water or NMP to thereby prepare a 30-mass % PAA solution; and 10 g (41.6 mmol in terms of monomer of the PAA) of the PAA solution was taken in a flask in a nitrogen atmosphere. A specific amount of lithium hydroxide monohydrate was added in the flask and stirred at room temperature for 30 min to thereby convert some of carboxyl groups of the PAA contained in the PAA solution into a lithium salt. Separately, 1.03 g (5.19 mmol) of 4,4'-diaminodiphenylmethane was dissolved in a specific amount of NMP or water to thereby prepare a polyfunctional amine solution. The polyfunctional amine solution was dropped in the flask, and stirred at room temperature for 30 min. Thereafter, the resultant was subjected to a heat treatment (preheat treatment) at 110° C. for 2 hours by using a Dean•Stark apparatus to thereby obtain an intermediate composition in the state of being a solution whose solvent was a mixed solvent of NMP with water.

The amount of the lithium hydroxide monohydrate added was so adjusted that the degree of lithiation became a value indicated in Table 3. The amount of the lithium hydroxide monohydrate added was 0 g when the degree of lithiation was 0%. The kinds of the solvents constituting the PAA solution and the polyfunctional amine solution, and the use amounts of the solvents used for dissolving 4,4'-diaminodiphenylmethane were so adjusted that the mixing proportion (mass ratio) of NMP to water in the mixed solvent contained in the obtained intermediate composition became a value indicated in Table 3.

Then, the obtained solution of each intermediate composition was observed to evaluate whether or not each component constituting the intermediate composition was dissolved in the mixed solvent. The results are shown in Table 3. In Table 3, the case where each component constituting the intermediate composition was completely dissolved in the mixed solvent and no deposit could be recognized in the mixed solvent was represented by o; and the case where any of the components constituting the intermediate composition was insoluble in the mixed solvent and any deposit was recognized in the mixed solvent was represented by x.

TABLE 2

| Test Example | 1 | 7 | 8 | 9 | 10 |
|---|---|---|---|---|---|
| Binder for Negative Electrode | Example 1A | Example 2 | Example 3 | Example 4 | Example 5 |
| Degree of Lithiation (%) | 10 | 10 | 10 | 10 | 10 |
| Initial Charge Capacity (mAh/g) | 1710 | 1715 | 1700 | 1720 | 1710 |
| Initial Efficiency (%) | 78 | 78 | 78 | 78 | 78 |
| Cycle Characteristic (%) 25° C., 50 cycles | 92 | 91 | 93 | 92 | 92 |
| Cycle Characteristic (%) 0° C., 50 cycles | 86 | 83 | 87 | 84 | 85 |

TABLE 3

| | | Mixing Proportion (NMP/water) | | | | |
|---|---|---|---|---|---|---|
| | | 1:0 | 2:1 | 1:1 | 1:2 | 0:1 |
| Degree of Lithiation (%) | 0 | ○ | ○ | ○ | x | x |
| | 10 | x | ○ | ○ | ○ | x |
| | 20 | x | ○ | ○ | ○ | x |
| | 50 | x | ○ | ○ | ○ | x |
| | 75 | x | x | ○ | ○ | x |
| | 100 | x | x | x | x | x |

As indicated in Table 3, it was confirmed that with the lowering degree of lithiation, the intermediate composition had a tendency of becoming insoluble to the mixed solvent having a higher proportion of water; and with the increasing degree of lithiation, the intermediate composition had a tendency of becoming insoluble to the mixed solvent having a higher proportion of NMP. Then, when the degree of lithiation was 100%, the intermediate composition was insoluble to the mixed solvent having every mixing proportion.

From the above results, in order to obtain an intermediate composition in which the components constituting the intermediate composition dissolve in a mixed solvent, it is clear that the mixing proportion of NMP (nonaqueous solvent) to water in the mixed solvent needs to be set in a specific range according to the degree of lithiation. Specifically, it is conceivable that when the degree of lithiation is 50% or lower, the mixing proportion of NMP (nonaqueous solvent) to water in the mixed solvent is preferably made to be in the range of 2:1 to 1:2; and when the degree of lithiation is 50% or higher, the mixing proportion of NMP (nonaqueous solvent) to water in the mixed solvent is preferably made to be in the range of 1:1 to 1:2.

<Test 4>

Then, for the intermediate composition (PAA+4,4'-diaminodiphenylmethane, a degree of lithiation of 20%) of Example 1B and the intermediate composition (PAA+4,4'-diaminodiphenylmethane, a degree of lithiation of 0%) of Reference Example 1, the changes in the molecular structure by a heat treatment were analyzed by a thermal scanning infrared spectroscopy.

First, a disk-shaped substrate of 10 mm in diameter was molded from calcium fluoride crushed in a mortar. Then, about 10 μl of the solution of the intermediate composition of Example 1B or Reference Example 1 was dropped on one surface of the substrate in an argon atmosphere; the resultant was allowed to stand still and dried for 24 hours, and thereafter allowed to stand still and further dried for 1 hour under vacuum (reduced pressure). Thereby, there was fabricated a measurement sample having a layer of the intermediate composition of about 5 μm in thickness on one surface of the calcium fluoride substrate. The fabrication of the measurement sample was wholly carried out at room temperature. Then, while the obtained measurement sample was being heated in a helium circulation, a thermal scanning infrared spectroscopy (transmission method) was performed at each temperature of 30° C., 110° C., 150° C., 180° C. (immediately after), 180° C. (after being held for 30 min), 180° C. (after being held for 2 hours), 200° C. (immediately after) and 200° C. (after being held for 2 hours).

Measurement device: Fourier transform infrared spectrometer Cary 670 (manufactured by Agilent Technologies, Inc.)

Measurement temperature: the temperature was raised at a temperature-rise rate of 5° C./min from room temperature to 180° C., held at a state of 180° C. for 2 hours, and thereafter raised at a temperature-rise rate of 5° C./min from 180° C. to 200° C., and held at a state of 200° C. for 2 hours.

Resolution: 4 cm$^{-1}$

Number of integrations: 512 times

Wave number range: 4,000 to 400 cm$^{-1}$ (MCT detector)

Window material: KBr (lower limit of infrared transmission: 400 cm$^{-1}$)

Based on the comparison with an IR spectrum obtained for the intermediate composition of Reference Example 1, it is conceivable that a peak in the vicinity of 1,583 cm$^{-1}$ recognizable only in an IR spectrum obtained for the intermediate composition of Example 1B is a peak indicating carboxyl groups (COO—) converted into a lithium salt. Then, the intensity of the peak in the vicinity of 1,583 cm$^{-1}$ was nearly constant at each measurement temperature from room temperature to 200° C. From these results, it is clear that in the course of the heat treatment (condensation reaction of carboxyl groups with amino groups) for condensation-reacting the intermediate composition and even after the heat treatment, the carboxyl groups converted into a lithium salt are present as they are.

The invention claimed is:

1. A polymer compound to be used as a binder for a negative electrode of a power storage device, wherein
   the polymer compound is formed by condensing a polyacrylic acid having some of carboxyl groups converted into a lithium salt with a polyfunctional amine represented by the following general formula (1),
   a chain structure constituted by the polyacrylic acid has free carboxyl groups and carboxyl groups converted into a lithium salt:

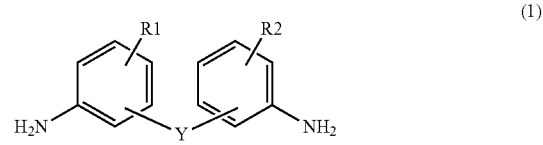

(1)

where
   Y is a straight-chain alkyl group having 1 to 4 carbon atoms, a phenylene group, or an oxygen atom, and
   R1 and R2 are each independently one or more hydrogen atoms, a methyl group, an ethyl group, a trifluoromethyl group, or a methoxy group.

2. A polymer compound to be used as a binder for a negative electrode of a power storage device, wherein
   the polymer compound has a chain structure constituted by a polyacrylic acid, and a crosslinked structure connecting carboxyl groups in the chain structure or between the chain structures with each other,
   the crosslinked structure is at least one crosslinked structure selected from the following general formulae (2) to (4), and
   the chain structure has free carboxyl groups and carboxyl groups converted into a lithium salt

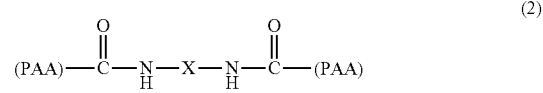

(2)

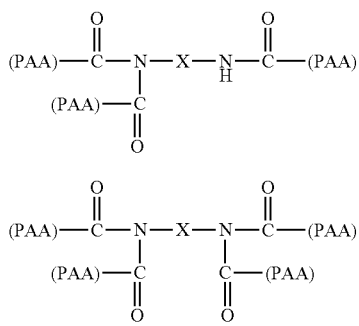

where PAA denotes the chain structure constituted by the polyacrylic acid converted into a lithium salt;

X is a structure represented by the following general formula (5):

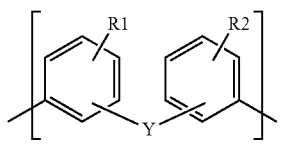

where
Y is a straight-chain alkyl group having 1 to 4 carbon atoms, a phenylene group, or an oxygen atom, and
R1 and R2 are each independently a hydrogen atom, a methyl group, a trifluoromethyl group, or a methoxy group.

3. The polymer compound according to claim 1, wherein a ratio of the free carboxyl groups to the carboxyl groups converted into a lithium salt is in the range of 95:5 to 25:75.

4. A method for producing a polymer compound according to claim 2, comprising heating a polyacrylic acid having some of carboxyl groups converted into a lithium salt, and a polyfunctional amine represented by the following general formula (1) in a mixed solvent of a nonaqueous solvent with water at 150 to 230° C.:

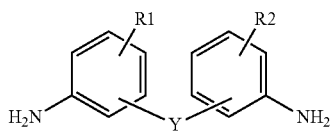

where
Y is a straight-chain alkyl group having 1 to 4 carbon atoms, a phenylene group or an oxygen atom, and
R1 and R2 are each independently one or more hydrogen atoms, a methyl group, an ethyl group, a trifluoromethyl group, or a methoxy group.

5. A negative electrode of a power storage device, comprising:
a binder for a negative electrode containing a polymer compound according to claim 1; and
a negative electrode active substance,
wherein the negative electrode active substance is at least one selected from carbon-based materials capable of occluding and releasing lithium, elements alloyable with lithium, and compounds having an element alloyable with lithium.

6. A power storage device comprising:
a negative electrode according to claim 5; and
a nonaqueous electrolyte.

7. An intermediate composition of a polymer compound to be used as a binder for a negative electrode of a power storage device, wherein
the intermediate composition contains a polyacrylic acid having some of carboxyl groups converted into a lithium salt, a polyfunctional amine represented by the following general formula (1), and a mixed solvent of a nonaqueous solvent with water,
the polyacrylic acid and the polyfunctional amine are dissolved in the mixed solvent:

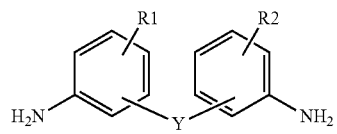

where
Y is a straight-chain alkyl group having 1 to 4 carbon atoms, a phenylene group or an oxygen atom, and
R1 and R2 are each independently one or more hydrogen atoms, a methyl group, an ethyl group, a trifluoromethyl group, or a methoxy group.

8. The intermediate composition according to claim 7, wherein a degree of lithiation is in the range of 5 to 50%, the degree of lithiation being determined by $$LC/(C-A) \times 100$$

where
C represents a total number of carboxyl groups derived from the polyacrylic acid,
LC represents, out of carboxyl groups derived from the polyacrylic acid, a total number of carboxyl groups converted into a lithium salt, and
A represents a total number of amino groups derived from the polyfunctional amine, and
wherein a mixing proportion of the nonaqueous solvent to water in the mixed solvent is in the range of 2:1 to 1:2.

9. The intermediate composition according to claim 7, wherein a degree of lithiation is in the range of 50 to 75%, the degree of lithiation being determined by:

$$LC/(C-A) \times 100$$

where
C represents a total number of carboxyl groups derived from the polyacrylic acid,
LC represents, out of carboxyl groups derived from the polyacrylic acid, a total number of carboxyl groups converted into a lithium salt, and
A represents a total number of amino groups derived from the polyfunctional amine, and
wherein a mixing proportion of the nonaqueous solvent to water in the mixed solvent is in the range of 1:1 to 1:2.

10. A slurry for a negative electrode to be used for production of a negative electrode of a power storage device, wherein
the slurry contains an intermediate composition according to claim 7 and a negative electrode active substance, and the negative electrode active substance is at least one selected from carbon-based materials capable of occluding and releasing lithium, elements alloyable with lithium, and compounds having an element alloyable with lithium.

11. A method for producing a negative electrode of a power storage device, wherein a negative electrode active substance layer is formed on a current collector by using a slurry for a negative electrode according to claim 10.

12. The polymer compound according to claim 2, wherein a ratio of the free carboxyl groups to the carboxyl groups converted into a lithium salt is in the range of 95:5 to 25:75.

* * * * *